(12) United States Patent
Harris

(10) Patent No.: US 10,503,131 B2
(45) Date of Patent: Dec. 10, 2019

(54) PRECISION SHAFT ALIGNMENT SYSTEM

(71) Applicant: Danny Harris, Ashland, KY (US)

(72) Inventor: Danny Harris, Ashland, KY (US)

( * ) Notice: Subject to any disclaimer, the term of this patent is extended or adjusted under 35 U.S.C. 154(b) by 41 days.

(21) Appl. No.: 15/851,720

(22) Filed: Dec. 21, 2017

(65) Prior Publication Data

US 2018/0181096 A1    Jun. 28, 2018

Related U.S. Application Data

(63) Continuation-in-part of application No. 14/453,425, filed on Aug. 6, 2014, now abandoned.

(51) Int. Cl.
| | | |
|---|---|---|
| *G05B 19/04* | (2006.01) | |
| *G05B 19/402* | (2006.01) | |
| *G05B 15/02* | (2006.01) | |
| *B66F 3/24* | (2006.01) | |
| *B66F 3/44* | (2006.01) | |
| *B66F 3/35* | (2006.01) | |
| *B66F 3/46* | (2006.01) | |
| *G05B 19/042* | (2006.01) | |
| *B66F 11/04* | (2006.01) | |
| *G01B 11/27* | (2006.01) | |

(52) U.S. Cl.
CPC .......... *G05B 19/0405* (2013.01); *B66F 3/247* (2013.01); *B66F 3/35* (2013.01); *B66F 3/44* (2013.01); *B66F 3/46* (2013.01); *G05B 15/02* (2013.01); *G05B 19/0426* (2013.01); *G05B 19/402* (2013.01); *B66F 11/04* (2013.01); *G01B 11/272* (2013.01); *G05B 2219/37275* (2013.01); *G05B 2219/41091* (2013.01)

(58) Field of Classification Search
CPC .. G05B 19/0405; G05B 19/402; G05B 15/02; B66F 3/247; B66F 3/44; B66F 11/04; G01B 5/25
See application file for complete search history.

(56) References Cited

U.S. PATENT DOCUMENTS

| | | | | | |
|---|---|---|---|---|---|
| 3,849,857 A | * | 11/1974 | Murray, Jr. | .............. | F16M 7/00 |
| | | | | | 248/346.06 |
| 4,367,594 A | * | 1/1983 | Murray, Jr. | .............. | G01B 5/25 |
| | | | | | 33/412 |
| 4,553,335 A | * | 11/1985 | Woyton | ................... | G01B 5/25 |
| | | | | | 33/645 |

(Continued)

*Primary Examiner* — Lisa E Peters
(74) *Attorney, Agent, or Firm* — S&L US IP Attorneys, P.C.; Timothy Marc Shropshire

(57) ABSTRACT

A precision shaft alignment system for establishing precise concentric axial alignment of a first shaft rotatably mounted and extending from a fixed unit and a second shaft extending from a variable position unit towards the first shaft includes a control and computing interface module, a pair of measuring means for precisely measuring at least one position of the first shaft and the second shaft and a jacking system for precisely aligning the shafts. The pair of measuring means is in communication with the control and computing interface module for transferring the at least one position of the first shaft and the second shaft for establishing precise concentric axial alignment of the first shaft and the second shaft. The jacking system is controlled by the control and computing interface module for precisely aligning the shaft.

20 Claims, 11 Drawing Sheets

(56) References Cited

U.S. PATENT DOCUMENTS

| | | | | |
|---|---|---|---|---|
| 4,856,945 | A * | 8/1989 | Bareis | B23B 29/02 |
| | | | | 408/72 R |
| 5,715,609 | A * | 2/1998 | Nower | G01B 5/0002 |
| | | | | 33/412 |
| 5,813,661 | A * | 9/1998 | Vann | B60S 9/02 |
| | | | | 254/1 |
| 5,896,672 | A * | 4/1999 | Harris | G01B 5/25 |
| | | | | 33/286 |
| 6,293,534 | B1 * | 9/2001 | Leban | B23Q 1/032 |
| | | | | 269/20 |
| 6,401,348 | B1 * | 6/2002 | Cavanaugh | B23B 25/06 |
| | | | | 33/502 |
| 8,209,875 | B1 * | 7/2012 | Harris | G01B 5/25 |
| | | | | 33/286 |
| 2008/0296424 | A1 * | 12/2008 | Frangenberg | B02C 4/02 |
| | | | | 241/231 |
| 2015/0081102 | A1 * | 3/2015 | Kopp | B64C 13/30 |
| | | | | 700/275 |

* cited by examiner

PRECISION SHAFT ALIGNMENT SYSTEM

CROSS-REFERENCE TO RELATED APPLICATION

This is a continuation-in-part of U.S. patent application Ser. No. 14/453,425, filed Aug. 6, 2014.

BACKGROUND OF THE INVENTION

Technical Field of the Invention

The present invention relates generally to alignment systems and, more specifically, to a precision shaft alignment system for establishing concentric alignment of a first rotatably mounted shaft and a second opposed rotatably mounted shaft.

Description of the Prior Art

Conventional loading units having rotatably mounted shafts are coupled to a rotatably mounted shaft of a first torque-producing unit. For effective coupling, the alignments of the rotatably mounted shafts of the loading unit and the first torque-producing unit are important. The desired axial alignment, if true and precise, provides for the high efficiency coupling of torque from the first unit to the second unit. Often the shafts are associated with respective rotating members of the each unit. The misalignment of the shafts of the first unit to the second unit while coupling may provide an x, y angular alignment error. This misalignment of the shafts may cause the center-lines of the two shafts to intersect at an angle, or may be manifested by a x, y parallel offset misalignment error where the respective shafts are parallel but exhibit an axial offset with the center-lines of each shaft not concentrically or coaxially aligned. If the first unit and the second unit are not properly aligned, the respective shafts of which may not be axially aligned along a common center-line or axis. This will lead to inefficient coupling of the shafts of the first and second units and in some worst cases the result of these types of inefficient coupling may be damage to various components including items such as bearings, seals, gears, couplings, and ultimately machine failure. In addition, these types of inefficient coupling between the shafts may lead to energy lost via friction and vibration. Thus with a proper coupling between the shafts of the first and second rotating units, more energy may be conserved with proper axial alignment and can be delivered to the load.

Several manual and automated precision shaft alignment systems exists, which may be utilized as a stand alone system, or may be retrofitted with an existing measuring system. However the existing precision shaft alignment systems failed to establish as high an accurate concentric alignment of a first rotatably mounted shaft and a second rotatably mounted shaft, which leads to maximum energy efficiency, less friction to the moving parts, reduced noise, increased lifespan etc. These existing systems failed to effectively process the plurality of information from a plurality of measuring means because of static movement to allow for the highest degree of positioning accuracy of the first and the second rotatable shaft during the process of coupling the shafts. Moreover, the existing shaft alignment systems failed to process the position information of the shafts till achieving the highest degree of aligning accuracy because of the high error ratio of the input measurement data requirements while achieving the horizontal alignment process. There exists no other systems performing horizontal dynamic direct response calculations without entering user input distance measurements giving reference to the distance between measuring devices and distances from one of the measuring devices to the front and rear of the motor feet. This is a requirement of other systems and the disadvantage is it is difficult to obtain accurate input measurements. The more accurate or abstemious the input measurement gives the most accurate alignment positioning results. This system utilizes calculated information that is based only on dynamic direct response readings without user input information. This system eliminates the disadvantage other systems have and gives the highest level possible of abstemious minute horizontal dynamic directly responsive calculated positioning accuracy. In addition, there exists no other system that compensates for static movement caused by applied pressure difference against the motor when you are moving the motor to correct the misalignment which affects the alignment readings. This compensation allows the user to achieve the highest degree of manual horizontal positioning accuracy. The needed system would also enable the automatic horizontal alignment to have a coil operated floating engagement device and would have the ability to compensate for static movement caused by applied pressure difference against the motor when you are moving the motor.

Hence there exists a need for an improved precision shaft alignment system for establishing precise concentric alignment of a first rotatably mounted shaft and a second opposed rotatably mounted shaft. The needed system would be able to receive information from two shaft mounted digital or laser measuring means (118, 120) to allow for the highest degree of positioning accuracy of the first rotatably mounted shaft and the second opposed, rotatably mounted shaft. Further, the needed system would provide a computing, control and display module that calculates and initiates and controls positions of the first rotatably mounted shaft and/or the second opposed, rotatably mounted shaft automatically with highest degree of aligning accuracy. Moreover, the needed system would allow for manual alignment of the shafts with highest degree of aligning accuracy. In addition, the needed system would be able to receive position information of the fixed and variable shafts and would be capable of processing the information to allow for the highest degree of aligning accuracy. Further, the needed system would be provided with a manual or automated vertical program having built-in soft foot detection to allow the user to achieve a vertical alignment of the shafts with a highest level of accuracy. Further, the needed system would enable a user to align a shaft to a housing or container manually or through automated process supported by taking gap measurements between the horizontal and vertical shaft and the housing/container at each end of the housing/container. This information would be entered manually into the touch screen display or transmitted via wired or wireless to the CPU. Entering manually to the touch screen display the inside and outside dimensions of the housing and shaft and the length of the container or housing along with the distance from each end of the container or housing to the front and rear of the mounting feet. The needed system would be able to perform dynamic direct response calculations while guiding you through the alignment process with flashing lights showing the correct movement direction. The front and rear movement correction distances are displayed on the control and computing module for horizontal and vertical alignment process based on information obtained from the 2 digital or laser measuring means 118, 120. The present invention addresses such a need.

SUMMARY OF THE INVENTION

The present invention is a precision shaft alignment system for establishing precise concentric axial alignment of a first shaft rotatably mounted and extending from a fixed unit and a second shaft extending from a variable position unit towards the first shaft to precisely couple with the second shaft of the variable position unit. The precision shaft alignment system comprises a control and computing interface module for establishing precise concentric axial alignment of the first shaft of the fixed unit and the second shaft of the variable position unit by processing a plurality of information, from two shaft mounted laser or digital measuring means (118, 120) for precisely measuring at least one position of the first shaft and the second shaft and a jacking system. The two laser or digital measuring means is in communication with the control and computing interface module for transferring the at least one position of the first shaft and the second shaft for establishing precise concentric axial alignment of the first shaft and the second shaft. The jacking system is controlled by the control and computing interface module for horizontal and/or vertical arrangement of the second shaft extending from the variable position unit. The jacking system is in communication with and controlled by the control and computing interface module to reposition the second shaft horizontally and/or vertically to establish precise concentric axial alignment with the first shaft extending from the fixed unit.

A primary object of the present invention is to provide a precision shaft alignment system for establishing concentric alignment of a first rotatably mounted shaft and a second opposed, rotatably mounted shaft.

Another object of the present invention is to provide a precision shaft alignment system capable of receiving a plurality of information from two shaft mounted laser or digital measuring means to allow for the highest degree of positioning accuracy of the first rotatably mounted shaft and the second opposed, rotatably mounted shaft.

Yet another object of the present invention is to provide a precision shaft alignment system with a computing, control and display module that calculates and initiates and controls positions of the first rotatably mounted shaft and/or the second opposed, rotatably mounted shaft automatically with the highest degree of aligning accuracy.

Still yet another object of the present invention is to provide a precision shaft alignment system with a computing, control and display module that calculates positions of the first rotatably mounted shaft and/or the second opposed, rotatably mounted shaft and allows for manual alignment of the shafts with the highest degree of aligning accuracy.

Still yet another object of the present invention is to provide a precision shaft alignment system with precision measuring devices that have two-way RS 232 communication that receive and transmit the position information of the shafts as presets to allow for the highest degree of aligning accuracy.

Another object of the present invention is to provide a precision shaft alignment system with manual and automated horizontal and vertical alignment process leading to the highest degree of positioning accuracy.

Still yet another object of the present invention is to enable a user to align a shaft to a housing or container manually or through automated process supported by taking gap measurements between the horizontal and vertical shaft and the housing/container at each end of the housing/container and entering manually into the touch screen display or transmitting via wired or wireless to the CPU.

Entering manually into the touch screen display the outside diameter measurements of the shaft and the inside diameter measurements of the housing. In addition to achieve the vertical alignment process the length of the container and the distance from each end of the container to the front and rear mounting feet are entered manually into the touch screen display.

Still yet another object of the present invention is to provide a precision horizontal shaft alignment system with dynamic direct response calculations. There exists no other systems performing horizontal dynamic direct response calculations without entering user input distance measurements giving reference to the distance between measuring devices and distances from one of the measuring devices to front and rear of the motor feet. This is a requirement of other systems and the disadvantage is it is difficult to obtain accurate input measurements the more accurate or abstemious the input measurement gives the most accurate alignment positioning results. This system utilizes calculated information that is based only on dynamic direct response readings without user input information. This system eliminates the disadvantage other systems have and gives the highest level possible of abstemious minute horizontal dynamic directly responsive calculated positioning accuracy Still yet another object of the present invention is to provide a precision shaft alignment system with vertical program having built-in soft foot detection to allow the user to achieve a vertical alignment with a high level of accuracy.

Yet another object of the present invention is to provide automated horizontal precision shaft alignment with a jacking system having a coil operated floating engagement device when activated applies pressure when deactivated allows freedom of axis movement thereby having the ability to allow measurement of compensation for static movement caused by applied pressure difference.

Yet another object of the present invention is to provide manual or automated horizontal precision shaft alignment capable of measuring, calculating, transmitting compensation data for static movement caused by applied pressure difference as presets to allow for the highest degree of positioning accuracy.

Yet another object of the present invention is to provide manual horizontal precision shaft alignment capable of compensating for static movement caused by applied pressure difference. By observing when numerical distance value readings reach 0.0000" at least one indicator light turns from green to red after stopping the movement during the manual alignment process. Upon relieving the jacking system 106, the at least one indicator light turns back to green and an amount of static movement is displayed in form of numerical distance value on the display means and/or the numerical distance display. To compensate for the static movement, the user may advance the movement of the variable position unit 116 until the red indicator light comes on and the user reaches the numerical distance value that was displayed on the display means and/or the numerical display. After the jacking system 106 is relieved and the reading of 0.0000" indicates that the user has compensated for static movement and left with a high precision total dynamic movement allowing for the highest degree of positioning accuracy. The user may also activate the automated button when doing manual horizontal alignment then observe the amount of front and rear static movement by a comparison of the readings once movement begins to when movement is relieved. The numerical value difference is entered as input into the control and display unit as presets so that when observing the directional lights and front and rear values when those values are reached the horizontal function resets and the horizontal alignment is complete and the highest degree of positioning accuracy is achieved.

Additional objects of the present invention will appear as the description proceeds.

Other objects and advantages of the embodiments herein will become readily apparent from the following detailed description taken in conjunction with the accompanying drawings.

BRIEF DESCRIPTION OF THE DRAWING FIGURES

In the drawing figures, wherein similar features are denoted with similar reference numerals throughout the several views.

DESCRIPTION OF THE REFERENCE NUMERALS IN THE DRAWING FIGURES

Figure 1A:
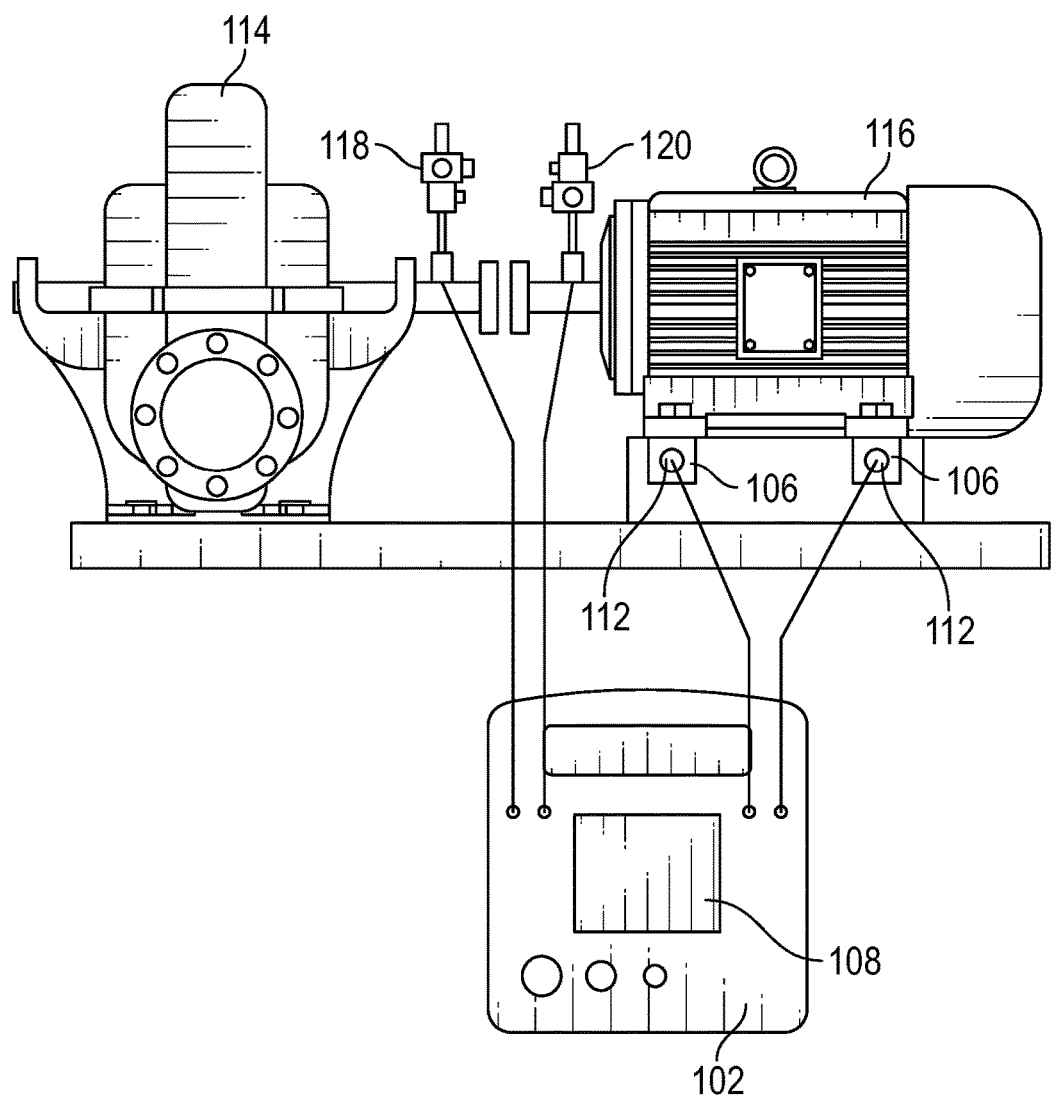
FIG. 1A shows the components of the precision shaft alignment system of the present invention.

Turning now descriptively to the drawings, in which similar reference characters denote similar elements throughout the several views, the figures illustrate the Precision Shaft Alignment System of the present invention. With regard to the reference numerals used, the following numbering is used throughout the various drawing figures:

100 Precision Shaft Alignment System of the present invention
102 control and computing interface module
104 digital inclinometer
106 jacking system
108 display unit
110 hydraulic jacking tools
112 coil operated floating engagement device
114 fixed unit
116 variable position unit
118 precision measuring module of the fixed until 114
120 precision measuring module of the variable position unit 116
122 horizontal adjustment means
124 vertical adjustment means

DETAILED DESCRIPTION OF THE DRAWING FIGURES AND PREFERRED EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical, electrical and other changes may be made without departing from the scope of the embodiments. The following detailed description is therefore not to be taken in a limiting sense.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Figure 1B:
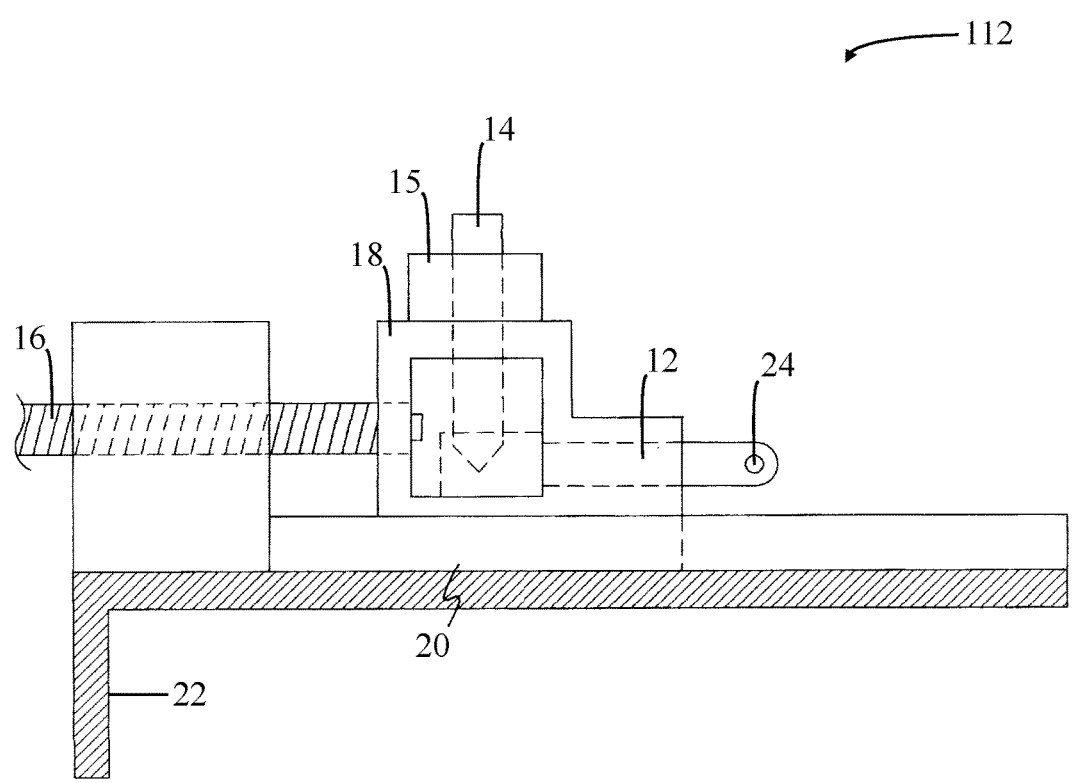
FIG. 1B shows the coil-operated floating engagement device, according to an embodiment of the present invention.

FIG. 1B shows the components of the precision shaft alignment system 100 of the present invention. More specifically, FIG. 1B shows a coil-operated floating engagement device, which includes an electro-magnetic coil 15, horizontal and vertical sliding shafts 12, 14 and an adjustment shaft 16. The housing 18 is supported by a linear bearing 20 atop mounting bracket 22. A screw jack assembly (not shown) is attachable to the horizontal sliding shaft 12 via a hole 24.

More particularly, the coil operated floating engagement device may be best understood as an electric-controlled locking engagement device independently operated, but directly connected to the electric motor driven worm gear screw jacks allowing the screw jacks to remain running but the load force created by the applied pressure between the worm gear screw jacks and the moveable component that is being jacked to be activated for movement or deactivated or neutralized allowing free movement.

When the jacking system is engaged in positioning the movable component into alignment there is applied load force on the jacking system that enables measuring device A and measuring device B to show x amount of deflective movement numeric values before actual movable component movement occurs. Once the movable component movement begins, this deflective movement is measured by the difference in the numeric values when the moving jacks with applied load force stop then again when the load force is released. These deflective value changes misrepresents the actual movable component movement you are trying to achieve which can then be calculated to determine and compensate for the amount of misrepresented movable component movement. This information can then be stored in the v memory location of a CPU to be used to achieve a more precise control of the shaft alignment positioning process with a higher degree of alignment accuracy.

Although measuring devices A and B reflect deflective readings these readings are regarded as static or no movement.

Figure 2:
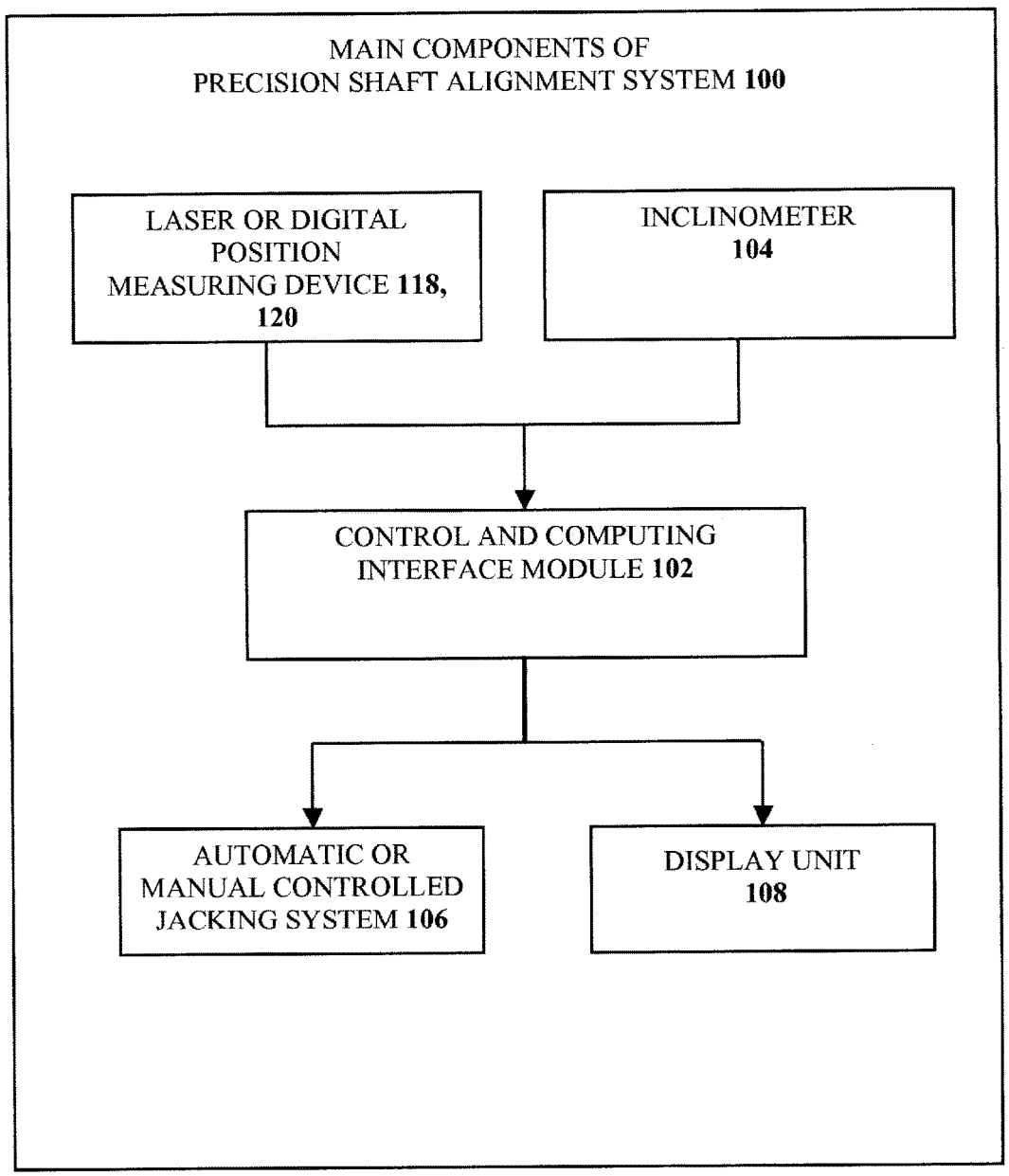
FIG. 2 is a block diagram describing a plurality of components of the precision shaft alignment system according to a preferred embodiment of the present invention.

FIG. 2 is a block diagram describing a plurality of components of the precision shaft alignment system 100 of a preferred embodiment of the present invention. The precision shaft alignment system 100 of the present invention provides an efficient means for establishing precise concentric axial alignment of a first shaft, which is being rotatably mounted, and extending from a fixed unit and a second shaft extending from a variable position unit towards the first shaft to precisely couple with the second shaft of the variable position unit. The precision shaft alignment system 100 of the preferred embodiment of the present invention provides manual and automatic methods for establishing precise concentric axial alignment of the first shaft of the fixed unit and the second shaft of the variable position unit. Here the fixed unit and the variable position unit may be a motor drive or a motor driven machine or the like. Both methods provide the user with a high precision and efficient means to align a motor drive shaft with the shaft of a motor driven machine or the like. The precision shaft alignment system 100 for establishing precise concentric axial alignment of the first shaft of the fixed unit and the second shaft of the variable position unit comprises a control and computing interface module 102 for processing a plurality of information received from two shaft mounted laser or digital measuring means 118, 120, wherein laser or digital measuring means 118 is associated with the fixed unit and laser or digital measuring means 120 is associated with the variable position unit. The two shaft mounted laser or digital measuring means 118, 120 is selected from a group of digital measuring units and/or laser measuring units to measure and to provide precise positions of the first shaft extending from the fixed unit and the second shaft extending from the variable position unit towards the first shaft to the control and computing interface module 102. The control and computing interface module 102 receives the plurality of positional information of the first shaft and the second shaft measured by the two shaft mounted laser or digital measuring means 118, 120 and processes calculations to precisely align the first shaft extending from the fixed unit and the second shaft extending from the variable position unit by controlling a jacking system 106 for precise horizontal and/or vertical arrangement of the second shaft and/or the variable position unit. Digital inclinometer 104 is used to measure the degrees of angle of rotation relative to Earth. Digital inclinometer 104 mounts to one of the shafts of the motor that is being aligned and can be controlled and viewed independently or configured wired or wireless for control and to display results on the display screen or display unit 108. This establishes a reference point to begin and end the simultaneous rotation of the shafts to obtain misalignment measurement information commonly called reverse alignment.

Figure 3:
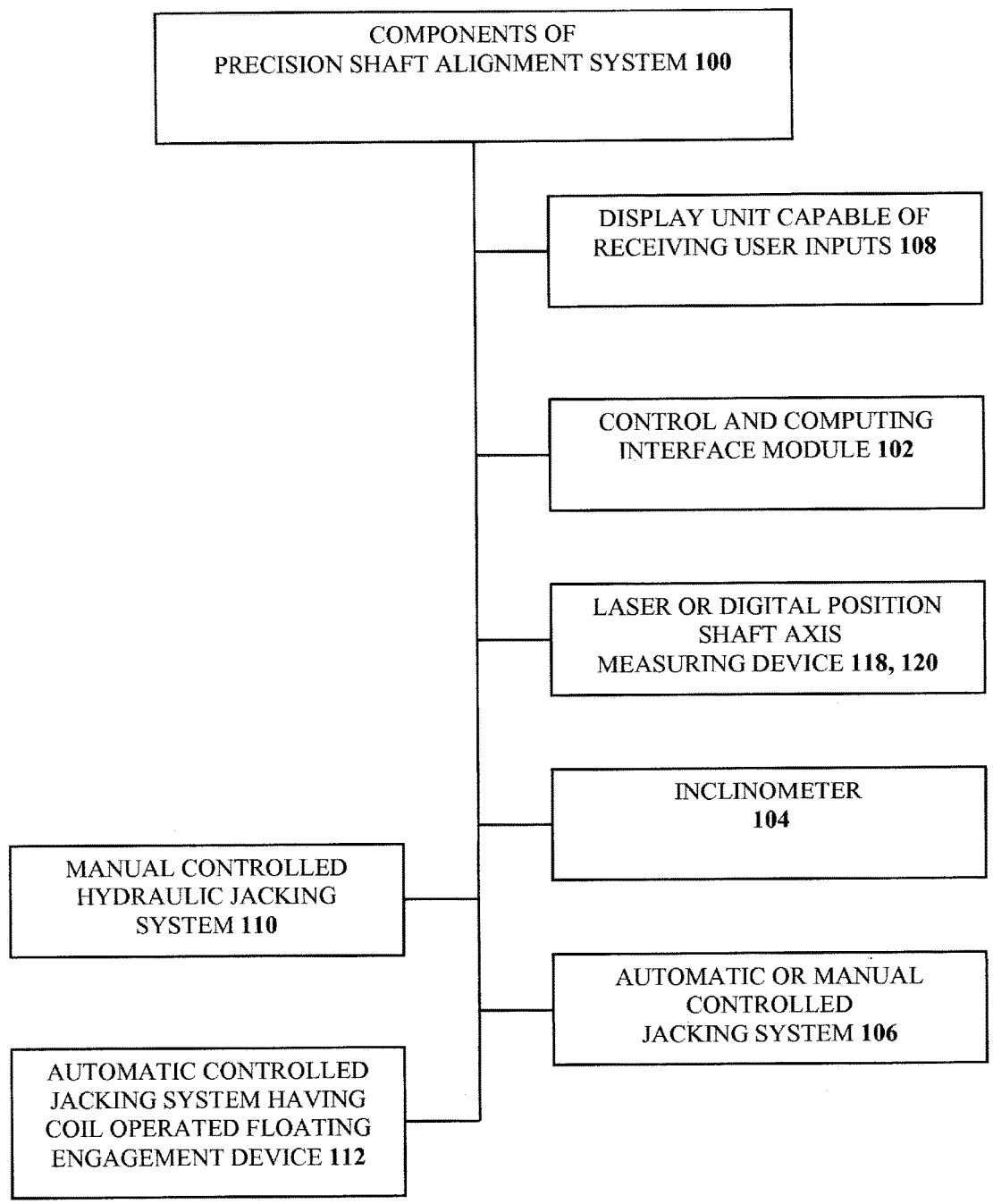
FIG. 3 is a block diagram of the precision shaft alignment system including a manual input means according to the preferred embodiment of the present invention.

FIG. 3 is a block diagram of the precision shaft alignment system 100 according to the preferred embodiment of the present invention comprising a plurality of components including a component user input device 108 such as, but not limited to, a touch screen monitor, a plurality of input keys or a touch screen display unit which is capable of displaying a plurality of information and for receiving a plurality of inputs from the user, the control and computing interface module 102 that is connected to the two shaft mounted laser or digital measuring means 118, 120 via wired or wireless means, and the jacking means 106 via wired or wireless controlled by the control and computing interface module 102 to precisely align the shafts of the fixed and the variable position unit. The two shaft-mounted laser or digital measuring means 118, 120 precisely measures and sends the coordinates of the first shaft and the second shaft based on the centerline of axis for each of the shafts to the control and computing interface module 102. The measured values or the measured information is calculated by the control and computing interface module 102 to allow for the highest degree of positioning accuracy. The jacking system 106 of the precision shaft alignment system 100 includes jack bolts and/or hydraulic jacking tools 110 allowing the user for a manual horizontal jacking process. The user can manually adjust the position of the shaft by viewing the information on the display unit 108 which includes flashing direction of front and rear movement lights and front and rear numeric distance values, which is provided by the control and computing interface module 102 based upon calculated information sent by the two shaft mounted laser or digital measuring means 118, 120, by adjusting the hydraulic jacking tools to precisely align the first shaft and the second shaft. Digital inclinometer 104 mounted to one of the shafts of the motor that is being aligned and can be controlled independently or configured wired or wireless for control. The jacking system 106 further includes an automated horizontal jacking assembly comprising at least two electric gear head motors and/or a pair of air gear motor driven screw jacks capable of being operated automatically based on at least one signal from the control and computing interface module 102 generated by the two shaft mounted laser or digital measuring means 118, 120 calculated information processed by the control and computing interface module 102. The jacking system 106 includes a coil operated floating engagement device 112 capable of being operated by energizing the coil 15 based on the at least one signal from the control and computing interface module 102 to apply force using the at least one jack whenever required for establishing precise concentric axial alignment of the second shaft of the variable position unit with the first shaft of the fixed unit. The coil operated floating engagement device 112 of the jacking system 106 when activated applies pressure when deactivated allows freedom of axis movement thereby having the ability to allow measurement of compensation for static movement caused by applied pressure difference. Thus, independent movement of the shaft is possible using the precision shaft alignment system 100 of the present invention.

While precisely aligning the first shaft of the fixed unit and the second shaft of the variable position unit using the jacking system 106 static movement of the variable position unit will arise. The static movement is caused by applied pressure movement difference against the motor feet before and after the pressure is applied and actual movement begins and ends. In the precision shaft alignment system 100 of the present invention the static movement is measured by the two shaft mounted laser or digital measuring means 118, 120 and the information is sent to the control and computing interface module 102 to be processed for calculations to allow for the highest degree of positioning accuracy of the shafts. The precision shaft alignment system 100 of the present invention compensates for the static movement caused by the applied pressure difference against the motor feet before and after the pressure is applied and it can be achieved manually or by using the automated button to enable automatic alignment of the shafts. The coil operated floating engagement device 112 of the jacking system 106 provides the ability to compensate for static verses dynamic movement of the at least one jack by making a comparison after force is applied and then released. Thus the plurality of information related to the movement of the at least one jack including the static movement information is send in form of presets to the control and computing interface module 102 to achieve a highest degree of positioning accuracy.

Figure 4:
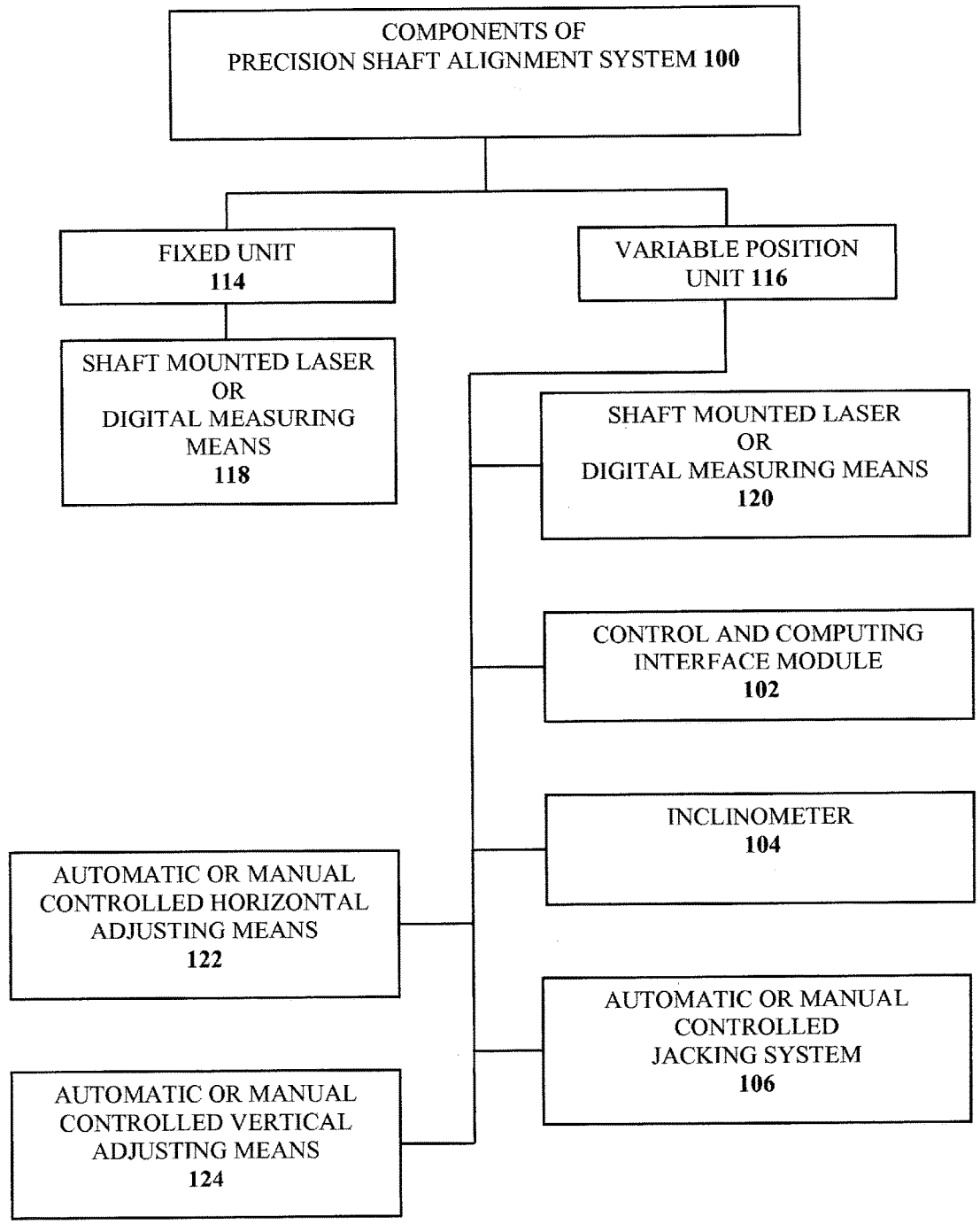
FIG. 4 is a block diagram of the precision shaft alignment system showing a plurality of controls or components for the fixed unit and the variable position unit of the present invention.

FIG. 4 is a block diagram of the precision shaft alignment system 100 showing a plurality of controls or components for the fixed unit 114 and the variable position unit 116 of the present invention. A plurality of precision measuring devices is utilized to identify the x-y coordinates of the shafts of the fixed unit 114 and the variable position unit 116. The fixed unit 114 is attached with shaft mounted laser or digital measuring or precision sensors 118 for measuring a position of the shaft of the fixed unit 114. The variable position unit 116 whose shaft to be precisely aligned with the shaft of the fixed unit 114 is also equipped with precision measuring modules 120 on the drive shaft. The inclinometer 104 mounted to one of the shafts is used to measure the degrees of angle of rotation relative to Earth. The plurality of measured values of the positions of the shafts of the variable position unit 116 and the fixed unit 114 by the precision measuring modules 118, 120 is send to the control and computing interface module 102. The control and computing interface module 102 processes the information and displays front and rear numerical distance values and front and rear directional movement lights on the display unit 108 for precise manual adjustments of the shaft using the manual controlled jacking system 106 or the control and computing interface module 102 automatically aligns the shafts by controlling the jacking system 106. The jacking system 106 is automatically controlled by the control and computing interface module 102 or can be manually controlled to act as a horizontal adjustment means 122 for the shafts of the variable position unit 116. Similarly the jacking system 106 can be automatically controlled by the control and computing interface module 102 or can be manually controlled to act as a vertical adjustment means 124 for the shafts of the fixed unit 114 or the variable position unit 116 based on the preset data send by the two shaft mounted laser or digital measuring means 118, 120. Thus the precision shaft alignment system 100 can be used to obtain precise alignment of the shafts of the fixed unit 114 and the variable position unit.

Figure 5:
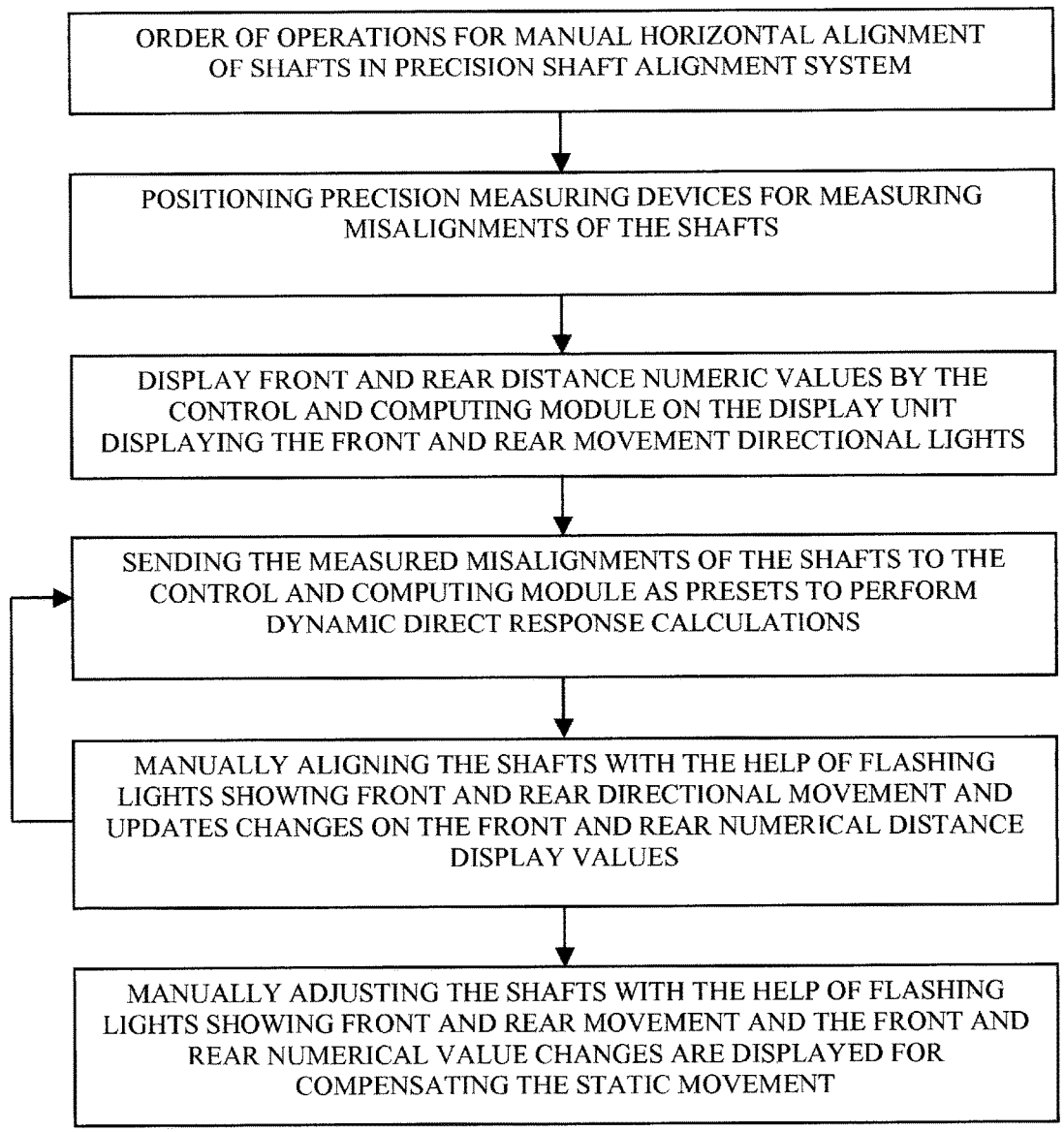
FIG. 5 is a flowchart showing a process of manual horizontal alignment of the shafts of the fixed unit and the variable position unit of the precision shaft alignment system.

FIG. 5 is a flowchart showing a process of manual horizontal alignment of the shafts of the fixed unit 114 and the variable position unit 116. The control and computing interface module 102 process the calculations of the plurality of measurements received from the two shaft mounted laser or digital measuring means 118, 120 and displays on the display unit to enable manual control of a position of the second shaft of the variable position unit 116 to establish precise concentric axial alignment of the first shaft of the fixed unit 114 with the second shaft of the variable position unit 116. The two shaft mounted laser or digital measuring means 118, 120 measures misalignments of the first shaft 114 and the second shaft 116 and sends to the control and computing interface module 102 as data to perform dynamic direct response calculations to correct the measured misalignment by horizontal movement of the at least one jack of the jacking system 106. The order of operations of the precision shaft alignment system 100 during manual control of the position of the second shaft of the variable position unit 116 to establish precise concentric axial alignment with the first shaft of the fixed unit 114 proceeds as described below. First the two shaft mounted laser or digital measuring means 118, 120 is attached to the shaft of the fixed unit 114 and the variable position unit 116 for precisely measuring at least one position of the first shaft and the second shaft and thereafter transferring the at least one position of the first shaft and the second shaft to the control and computing interface module 102 for establishing precise concentric axial alignment of the first shaft and the second shaft. Here the two shaft mounted laser or digital measuring means 118, 120 measures misalignments of the first shaft and the second shaft and sends to the control and computing interface module 102 to perform dynamic direct response calculations. There exists no other system performing horizontal dynamic direct response calculations without entering user input distance measurements giving reference to the distance between measuring devices and distances from one of the measuring devices to front and rear of the motor feet. This is a requirement of other systems and the disadvantage is it is difficult to obtain accurate input measurements the more accurate or abstemious the input measurement gives the most accurate alignment positioning results. This system utilizes calculated information that is based only on dynamic direct response readings without user input information. This system eliminates the disadvantage other systems have and gives the highest level possible of abstemious minute horizontal dynamic directly responsive calculated positioning accuracy. For manual alignment of the shafts of the fixed unit 114 and the variable position unit 116, the front and rear numerical distance values related to an amount of movement required for precise alignment of the first shaft and the second shaft is displayed on the display means and/or a numerical display such as a seven segment display or a liquid crystal (LCD) display. The display means includes a touch screen controller and is capable of graphically displaying a plurality of information and speeds up a process of alignment of the first shaft of the fixed unit 114 and the second shaft of the variable position unit 116 with a higher degree of precision accuracy. The front and rear numerical distance values that are displayed on the display means is updated in direct response to a plurality of movement changes of the first shaft and the second shaft. The co-processor of the control and computing module constantly scans the plurality of measurements of the two shaft mounted laser or digital measuring means 118, 120 and updates to the CPU of the control and computing interface module 102 as processed updated calculations. Based on the front and rear numerical distance values displayed on the display unit the user can perform manual alignment process by adjusting the jacking system 106. The user performing the manual alignment process being instructed with a plurality of flashing lights showing front and rear movement directions, of the variable position unit 116. The user can adjust the position of the variable position unit 116 with the help of the jack bolts and/or hydraulic jacking tools of the jacking system 106. The precision shaft alignment system 100 precisely controls the movement during the manual alignment process by signaling when to stop and/or back up, front and rear movements in advance within 0.0000" accuracy. The user achieves this accuracy by observing the front and rear numeric distance value display presets during movement of the variable position unit 116. While precisely aligning the first shaft of the fixed unit 114 and the second shaft of the variable position unit 116 using the jacking system 106, static movement of the variable position unit 116 may arise. When numerical distance value readings reach 0.0000" at least one indicator light turns from green to red after stopping the movement during the manual alignment process. Upon relieving the jacking system 106, the at least one indicator light turns back to green and an amount of static movement is displayed in form of numerical distance value on the display means and/or the numerical distance display. To compensate for the static movement, the user may advance the movement of the variable position unit 116 until the red indicator light comes on and the user reaches the numerical distance value that was displayed on the display means and/or the numerical display. After the jacking system 106 is relieved and the reading of 0.0000" indicates that the user has compensated for static movement and left with a high precision total dynamic movement allowing for the highest degree of positioning accuracy. The user may also activate the automated button when doing manual horizontal alignment then observe the amount of front and rear static movement by a comparison of the readings once movement begins to when movement is relieved. The numerical value difference is entered as input into the control and display unit as presets so that when observing the directional lights and front and rear values when those values are reached the systems horizontal function resets and the horizontal alignment is complete and the highest degree of positioning accuracy is achieved.

Figure 6:
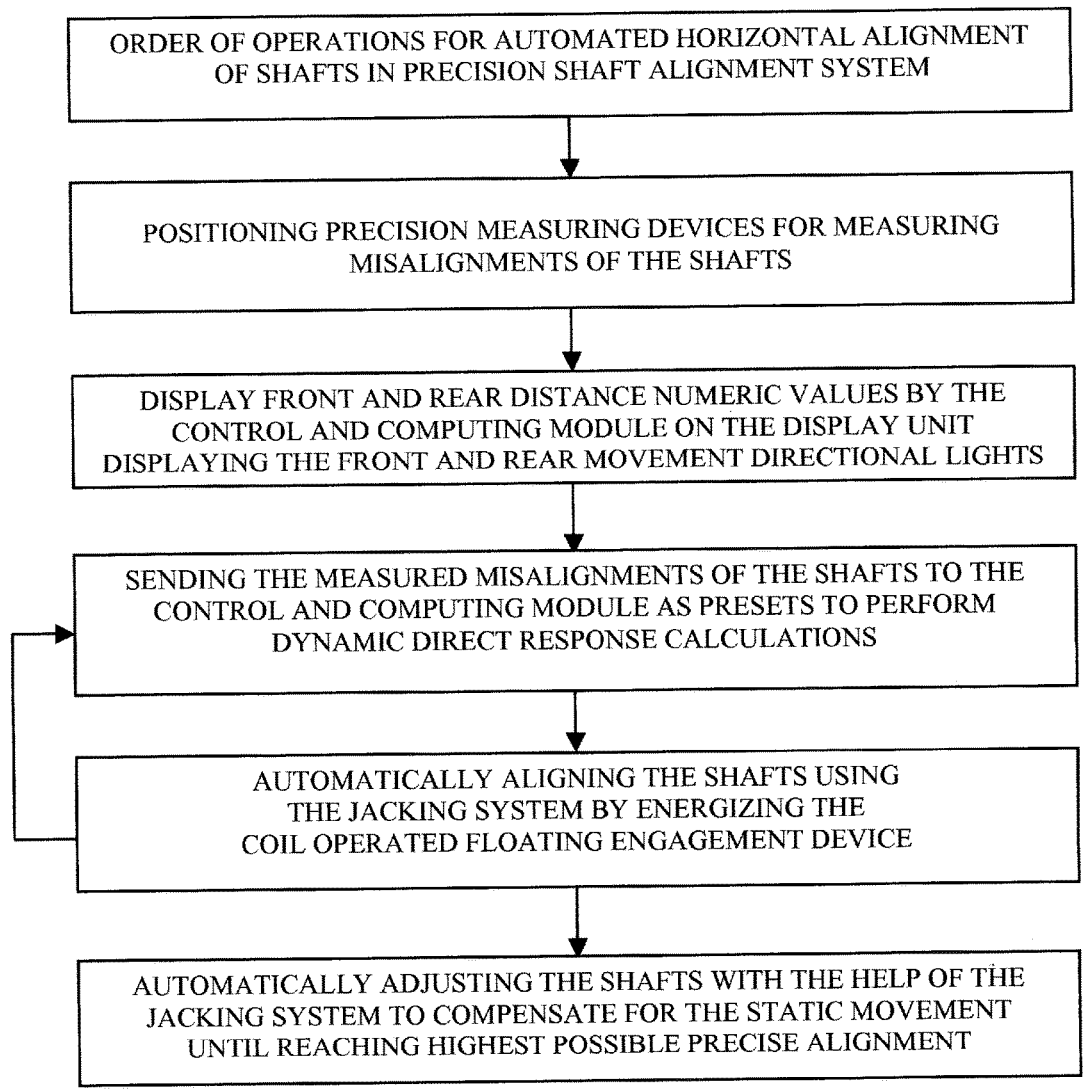
FIG. 6 is a flowchart showing a process of automatic horizontal alignment of the shafts of the fixed unit and the variable position unit of the precision shaft alignment system.

FIG. 6 is a flowchart showing a process of automatic horizontal alignment of the shafts of the fixed unit 114 and the variable position unit 116. The order of operations of the precision shaft alignment system 100 during automatic control of the position of the second shaft of the variable position unit 116 to establish precise concentric axial alignment with the first shaft of the fixed unit 114 proceeds as described below. First the two shaft mounted laser or digital measuring means 118, 120 is attached to the shaft of the fixed unit 114 and the variable position unit 116 for precisely measuring at least one position of the first shaft and the second shaft and thereafter transferring the at least one position of the first shaft and the second shaft to the control and computing interface module 102 for establishing precise concentric axial alignment of the first shaft and the second shaft. Here the two shaft mounted laser or digital measuring means 118, 120 measures misalignments of the first shaft and the second shaft and sends to the control and computing interface module 102 to perform a numerical front and rear value related to an amount of movement required and front and rear movement directional lights for precise alignment of the first shaft and the second shaft is displayed on the display means and/or a numerical display such as a seven-segment display or a liquid crystal (LCD) display. The control and computing module may include a touch screen controller and is capable of graphically displaying and/or the input of a plurality of information. The control and computing module speeds up a process of alignment of the first shaft of the fixed unit 114 and the second shaft of the variable position unit 116 with a higher degree of precision accuracy. The horizontal alignment of the shafts is automatically performed by the jacking means 106, which is controlled by the control and computing interface module 102 based on the received values of misalignments of the shafts. The front and rear numerical values displayed on the display means is updated in direct response to a plurality of movement changes of the first shaft and the second shaft. The co-processor of the control and computing module constantly scans the plurality of measurements of the two shaft mounted laser or digital measuring means 118, 120 and updates to the CPU of the control and computing interface module 102 as processed updated calculations of the measured dynamic positions of the shafts. After the automatic alignment of the shafts, the numerical value readings displayed on the display unit may reach 0.0000". While automatic precise alignment of the first shaft of the fixed unit 114 and the second shaft of the variable position unit 116 using the jacking system 106, the static movement of the variable position unit 116 may be compensated by the jacking system 106 controlled by the control and computing interface module 102 and are left with high precision total dynamic movement allowing for highest degree of positioning accuracy.

The jacking system 106 includes a coil operated floating engagement device 112 capable of being operated by energizing the coil 15 based on the at least one signal from the control and computing interface module 102 to apply force to at least one jack whenever required for establishing precise concentric axial alignment of the second shaft of the variable position unit 116 with the first shaft of the fixed unit 114. The coil operated floating engagement device 112 of the jacking system 106 provides freedom of movement for at least one jack of the jacking system 106 without constraining the movement axis of the other jack. Also, during the automatic precise alignment of the shafts, the coil operated floating engagement device 112 of the jacking system 106 provides the ability to compensate for static verses dynamic movement of the at least one jack by making a comparison after force is applied and then released. The plurality of information related to the movement of the at least one jack is sent in form of presets to the be calculated by the control and computing interface module 102 to achieve a highest degree of positioning accuracy. The operation of the automated horizontal jacking assembly may also be achieved by automatically operating the hydraulic jacking tools or the at least two electric gear head motors and/or a pair of air gear motor driven screw jacks that are capable of being operated automatically based on at least one signal from the control and computing interface module 102.

Figure 7:
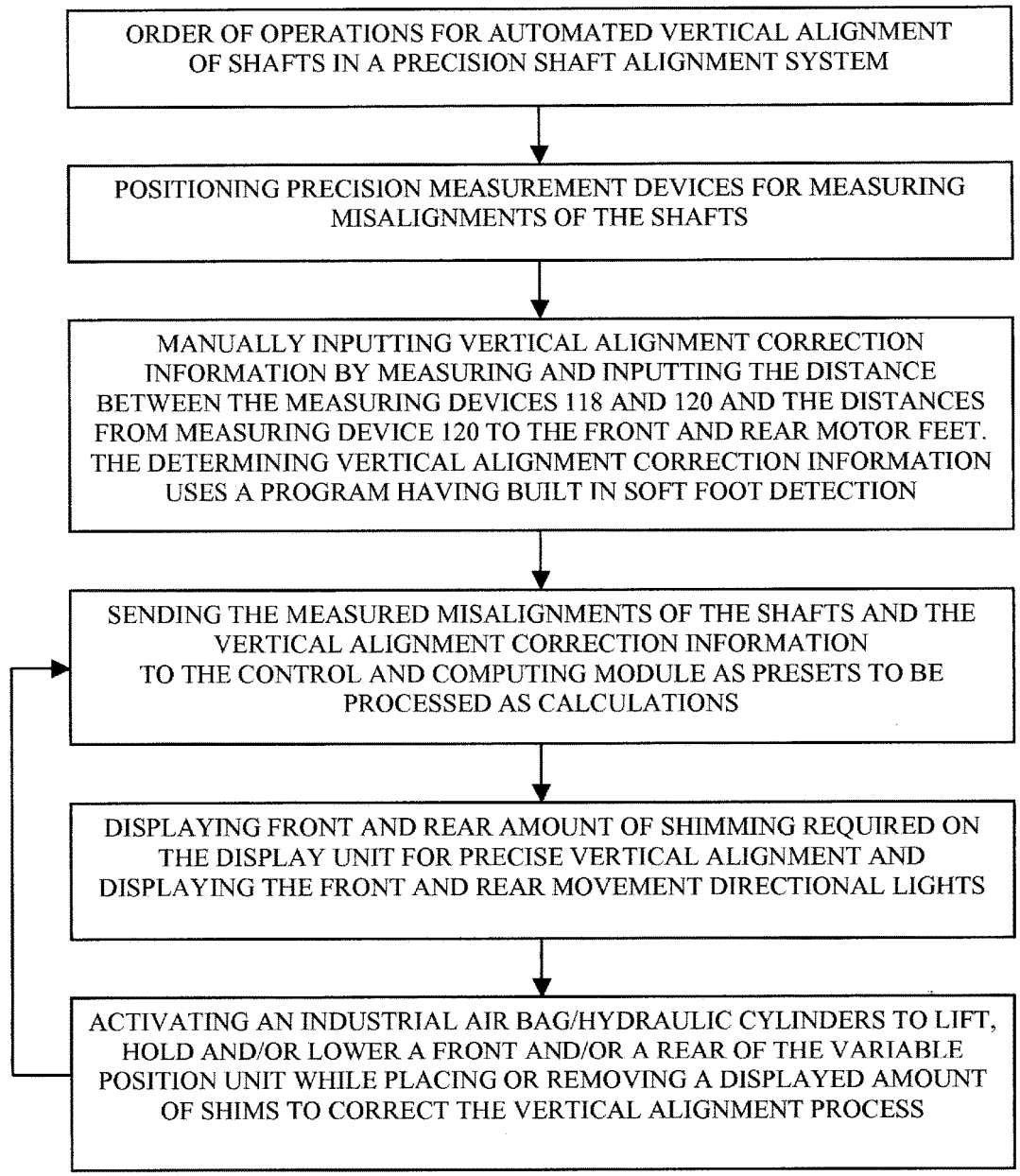
FIG. 7 is a flowchart showing a process of automated vertical alignment of the shafts of the fixed unit and the variable position unit of the precision shaft alignment system.

FIG. 7 is a flowchart showing a process of automated vertical alignment of the shafts of the fixed unit 114 and the variable position unit 116. Manually entering vertical alignment correction information by measuring and inputting the distance between the two shaft mounted laser or digital measuring means 118, 120 and the distance from measuring device 120 to the front and rear motor feet. The precision shaft alignment system 100 includes a program having built in soft foot detection, which is capable of determining vertical alignment correction information. The vertical alignment correction information determined by the built in soft foot detection program is displayed on the display means to allow the user to correct the soft foot, vertical misalignment information is sent from the two shaft mounted laser or digital measuring means 118, 120 to the control and computing module 102 and processed with calculations based upon the vertical correction information distances that were manually entered wherein the display means displays the correct amount of front and rear shims needed and front and rear directional lights to achieve the vertical alignment process of the first shaft and the second shaft with a high level of accuracy. This can be achieved either manually or by using automatic control. The precision shaft alignment system 100 includes automated alignment positioning using a coil energized air/hydraulic valve powered by a compressor/hydraulic pump responsive to the control and computing interface module 102 to activate an industrial air bag/hydraulic cylinders to lift, hold and/or lower a front and/or a rear of the variable position unit 116 while placing a displayed amount of a plurality of shims required to correct the vertical alignment process.

Figure 8:
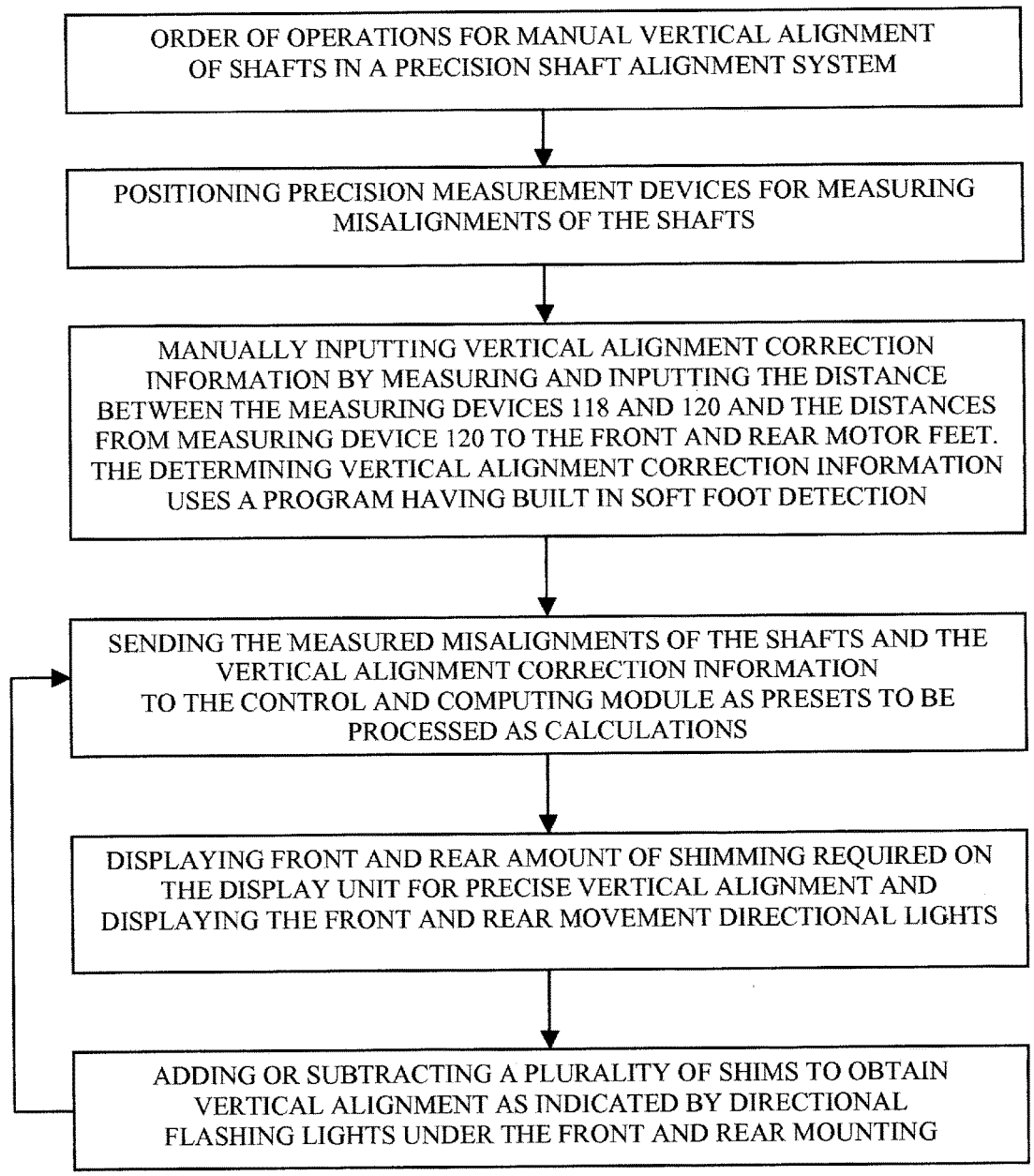
FIG. 8 is a flowchart showing a process of manual vertical alignment of the shafts of the fixed unit and the variable position unit of the precision shaft alignment system; and, FIGS. 9A and 9B, considered in combination, is a flowchart showing a process of horizontal and vertical aligning the shaft to a housing and/or the container manually and/or through automated process.

FIG. 8 is a flowchart showing a process of manual vertical alignment of the shafts of the fixed unit 114 and the variable position unit 116. Manually entering vertical alignment correction information by measuring and inputting the distance between the two-shaft mounted laser or digital measuring means 118, 120 and the distance from measuring device 120 to the front and rear motor feet.

The precision shaft alignment system 100 includes a program having built in soft foot detection, which is capable of determining vertical alignment correction information. The vertical alignment correction information determined by the build in soft foot detection program is displayed on the display means to allow the user to correct the soft foot, vertical misalignment information is sent from the two shaft mounted laser or digital measuring means 118, 120 to the control and computing module 102 and processed with calculations based upon the vertical correction information distances that were manually entered wherein the display means displays correct amount of front and rear shims needed to achieve the vertical alignment process of the first shaft and the second shaft with a high level of accuracy. The amount of shims required for vertical alignment correction is displayed on the display unit and by adding or subtracting a plurality of shims the vertical alignment of the shafts can be obtained. The vertical alignment of the shafts is obtained by adding or removing the shims indicated by at least one directional flashing lights under the front and/or rear mounting means.

The precision shaft alignment system 100 further comprises a program enabling the user to align a shaft to a housing and/or a container manually and/or through an automated process.

Figure 9A:
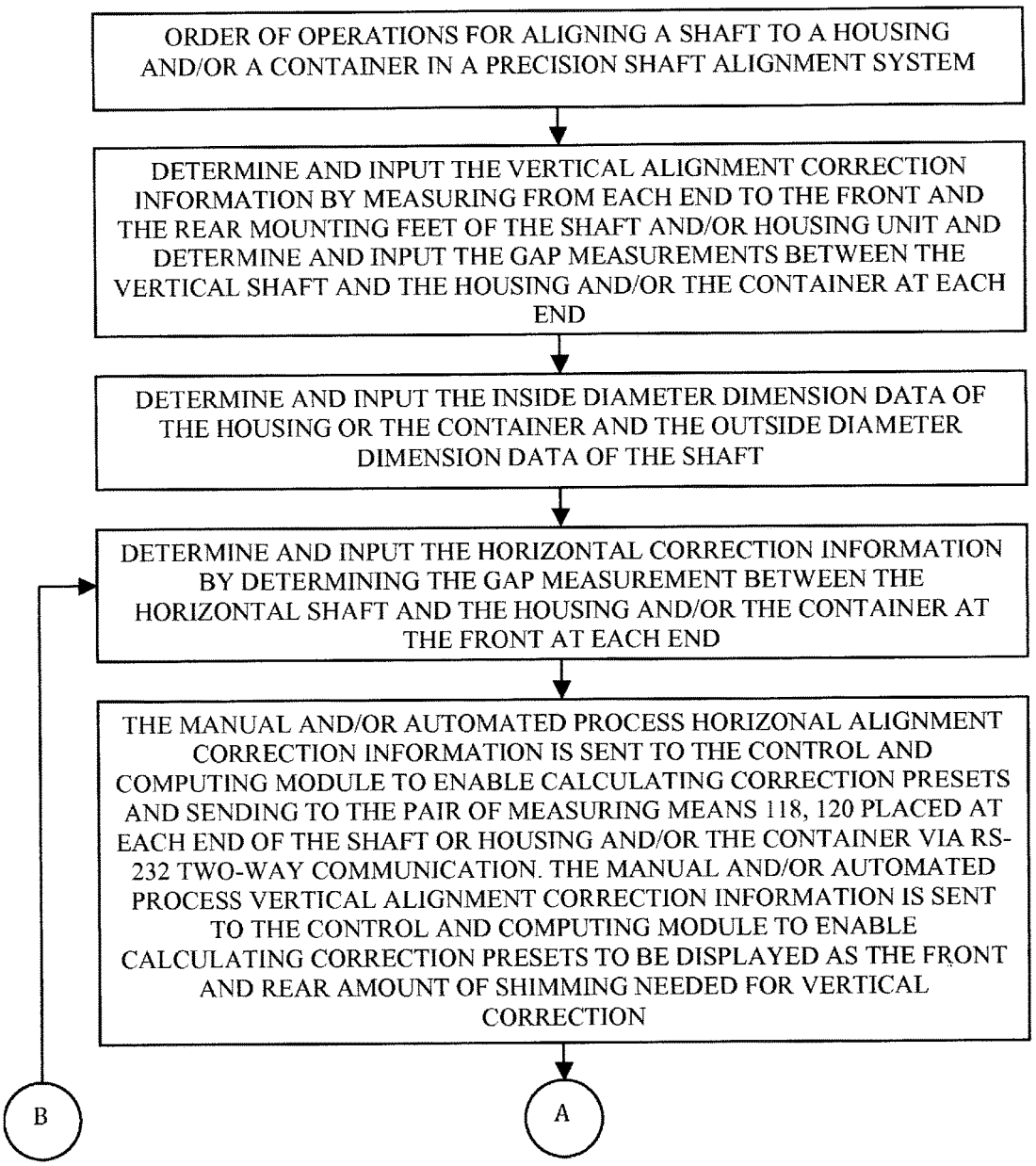
Figure 9B:
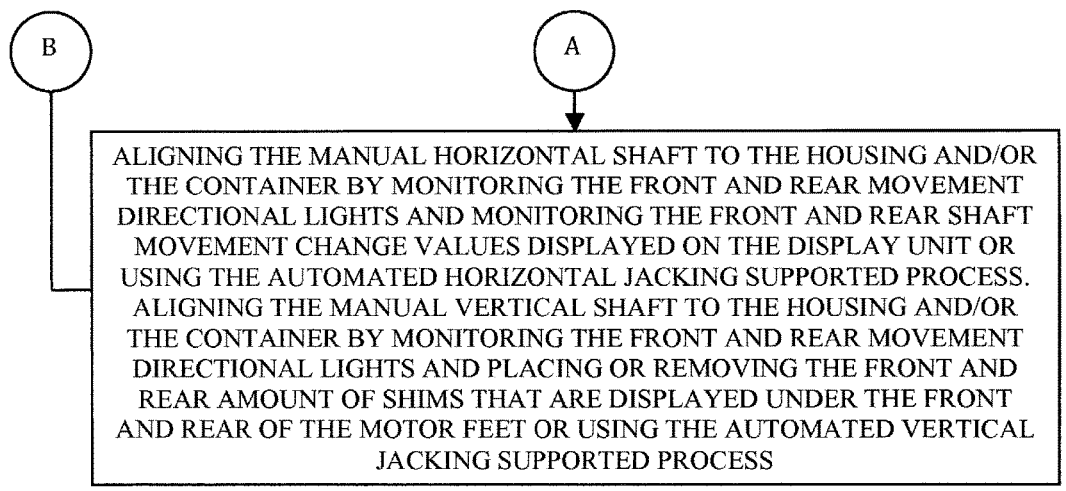

FIGS. 9A and 9B, taken together, presents a flowchart showing a process of aligning the shaft to a housing and/or the container manually and/or through automated process. The horizontal manual/automatic alignment process includes the process of measuring the gap between the shaft and the housing and/or the container by using a tapered gage and outside micrometers or laser gap/distance measurement device/s at each end of the housing and/or the container and entering manually into the touch screen display or transmitting via wired or wireless to the CPU. Entering manually the inside diameter dimension data of the housing and/or the container and the outside diameter dimension of the shaft for horizontal manual/automatic alignment of the shaft to the housing and/or the container. The program calculates the misalignment and enables horizontal manual/automatic alignment of the shaft to the housing and/or the container.

The program calculates at least one correction preset and sends via a two-way RS-232 communication wired or wireless to the two laser or digital measuring means 118, 120 placed at each end of the housing and/or the container to monitor the shaft movement changes. The front and rear movement distance values and the front and rear directional movement lights are displayed on the control and computing module 102.

The vertical manual/automatic alignment process includes a process of measuring the gap between the vertical shaft and the housing and/or the container by using a tapered gage and outside micrometers or laser gap/distance measurement device/s at each end of the housing and/or the container and entering manually to the touch screen display or transmitting via wired or wireless to the CPU. Entering manually into the touch screen display the inside diameter dimension data of the housing and/or the container and the outside diameter dimension of the shaft and (the length of the container or housing along with the distance from each end of the container or housing to the front and rear of the mounting feet) for vertical manual/automatic alignment of the shaft to the housing and/or the container. The front and rear shims required to correct the vertical is displayed on the display along with the front and rear movement direction and enables vertical manual/automatic alignment of the shaft to the housing and/or the container.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

I claim:

1. A precision shaft alignment system comprising:
   a. a first shaft extending from a fixed unit;
   b. a second shaft extending towards the first shaft from a variable-position unit, the first shaft and the second shaft being rotatably mounted to precisely couple with one another;
   c. a control and computing interface module;
   d. two lasers, one being mounted to the first shaft and the other being mounted to the second shaft, in communication with the control and computing interface module, wherein the lasers precisely measure at least one position of the first shaft and the second shaft relative to one another and communicate the at least one position to the control and computing interface module; and
   e. a jacking system coupled to the second shaft, the jacking system being in communication with, and controlled by, the control and computing interface module, wherein the jacking system comprises a floating engagement device including:
      i. an electro-magnetic coil in electrical communication with the control and computing interface module;
      ii. a housing;
      iii. a horizontal sliding shaft extending through a first side of the housing, wherein a first end of the horizontal sliding shaft is coupled to a jack assembly;
      iv. a vertical sliding shaft extending through the coil, wherein the vertical sliding shaft is configured to releasably engage a second end of the horizontal sliding shaft;
      v. a linear bearing atop a mounting bracket, wherein the housing movably engages the linear bearing; and
      vi. an adjustment shaft configured to move the housing along the linear bearing,
      wherein the coil is energized based on at least one signal from the control and computing interface module, wherein the at least one signal is calculated based on the at least one position of the first shaft and the second shaft, wherein, when the coil is energized, the vertical sliding shaft engages the horizontal sliding shaft, whereby the floating engagement device applies pressure to at least one jack of the jacking system, and wherein, when the coil is de-energized, the vertical sliding shaft disengages the horizontal sliding shaft, whereby the floating engagement device releases the pressure and allows freedom of axis movement to allow measurement of compensation for static movement caused by applied pressure difference against a system motor when the motor is moving to correct misalignment of the first shaft and the second shaft, wherein the jacking system repositions the second shaft horizontally, based on the at least one signal and the compensation for static movement, to establish precise concentric axial alignment with the first shaft, wherein all measurements and calculations, and horizontal adjustments of the second shaft are fully automated and are performed by the system.

2. The precision shaft alignment system of claim 1, wherein the control and computing interface module processes calculations of a plurality of measurements received from the lasers to enable automatic controlling of a position of the second shaft to establish precise concentric axial alignment of the first shaft with the second shaft.

3. The precision shaft alignment system of claim 1, wherein the control and computing interface module processes calculations of a plurality of measurements received from the lasers to enable manual control of a position of the second shaft to establish precise concentric axial alignment of the first shaft with the second shaft.

4. The precision shaft alignment system of claim 1, wherein the jacking system includes jack bolts and/or hydraulic jacking tools allowing for a manual horizontal jacking process by processing calculations for a plurality of measurements received from the lasers,
wherein the jacking system includes an automated horizontal jacking assembly comprising at least two electric gear head motors and/or a pair of air gear motor driven screw jacks capable of being operated automatically based on at least one signal from the control and computing interface module.

5. The precision shaft alignment system of claim 1, wherein the floating engagement device provides freedom of movement for at least one jack of the jacking system by allowing a movement of the at least one jack when a second jack is moving,
wherein the floating engagement device provides the ability to compensate for static movement of the at least one jack by making a comparison after force is applied and then released, and
wherein a plurality of information related to the movement of the at least one jack is sent to the control and computing interface module to determine a dynamic positioning value.

6. The precision shaft alignment system of claim 1, wherein the lasers measure misalignment of the first shaft and the second shaft and communicate the measured misalignment to the control and computing interface module to perform dynamic, direct-response calculations to correct the measured misalignment by horizontal movement of at least one jack of the jacking system.

7. The precision shaft alignment system of claim 1, further comprising a program having built-in soft foot detection, wherein the software is capable of determining vertical alignment correction information, wherein the vertical alignment correction information is displayed on a display to allow a user to correct a soft foot, wherein the display displays an amount of front and/or rear shims required to correct a vertical alignment process of the first shaft and the second shaft.

8. The precision shaft alignment system of claim 1, wherein a vertical alignment process includes measuring and inputting a distance between the lasers and a distance from the laser mounted to the second shaft to a front motor foot and a rear motor foot,
wherein a vertical alignment of the first shaft and the second shaft is obtained by adding or subtracting the amount of front and/or rear shims required to correct the vertical alignment process, and
wherein the vertical alignment of the first shaft and the second shaft is obtained as indicated by at least one directional flashing light under at least one of a front mounting and a rear mounting of the system.

9. The precision shaft alignment system of claim 1, wherein vertical positioning of the first shaft and the second shaft is automated, wherein the system further comprises:
 a. a coil-energized valve;
 b. a pump that powers the valve and is responsive to the control and computing interface module; and
 c. one or more support means activated by the pump, wherein the one or more support means lift, hold and/or lower a front and/or a rear of the variable-position unit,
 wherein a displayed number of front shims and rear shims are added or removed, as calculated by the control and computing interface module.

10. The precision shaft alignment system of claim 9, wherein the one or more support means is selected from the group consisting of cylinders and air bags.

11. A precision shaft alignment system comprising:
 a. a first shaft extending from a fixed unit;
 b. a second shaft extending towards the first shaft from a variable-position unit, the first shaft and the second shaft being rotatably mounted to precisely couple with one another;
 c. a control and computing interface module;
 d. two digital sensors, one being mounted to the first shaft and the other being mounted to the second shaft, in communication with the control and computing interface module, wherein the digital sensors precisely measure at least one position of the first shaft and the second shaft relative to one another and communicate the at least one position to the control and computing interface module; and
 e. a jacking system coupled to the second shaft, the jacking system being in communication with, and controlled by, the control and computing interface module, wherein the jacking system comprises a floating engagement device including:
  i. an electro-magnetic coil in electrical communication with the control and computing interface module;
  ii. a housing;
  iii. a horizontal sliding shaft extending through a first side of the housing, wherein a first end of the horizontal sliding shaft is coupled to a jack assembly;
  iv. a vertical sliding shaft extending through the coil, wherein the vertical sliding shaft is configured to releasably engage a second end of the horizontal sliding shaft;
  v. a linear bearing atop a mounting bracket, wherein the housing movably engages the linear bearing; and
  vi. an adjustment shaft configured to move the housing along the linear bearing, wherein the coil is energized based on at least one signal from the control and computing interface module, wherein the at least one signal is calculated based on the at least one position of the first shaft and the second shaft, wherein, when the coil is energized, the vertical sliding shaft engages the horizontal sliding shaft, whereby the floating engagement device applies pressure to at least one jack of the jacking system, and wherein, when the coil is de-energized, the vertical sliding shaft disengages the horizontal sliding shaft, whereby the floating engagement device releases the pressure and allows freedom of axis movement to allow measurement of compensation for static movement caused by applied pressure difference against a system motor when the motor is moving to correct misalignment of the first shaft and the second shaft, wherein the jacking system repositions the second shaft horizontally, based on the at least one signal and the compensation for static movement, to establish precise concentric axial alignment with the first shaft, wherein all measurements and calculations, and horizontal adjustments of the second shaft are fully automated and are performed by the system.

12. The precision shaft alignment system of claim 11, wherein the control and computing interface module processes calculations of a plurality of measurements received from the digital sensors to enable automatic controlling of a position of the second shaft to establish precise concentric axial alignment of the first shaft with the second shaft.

13. The precision shaft alignment system of claim 11, wherein the control and computing interface module processes calculations of a plurality of measurements received from the digital sensors to enable manual control of a position of the second shaft to establish precise concentric axial alignment of the first shaft with the second shaft.

14. The precision shaft alignment system of claim 11, wherein the jacking system includes jack bolts and/or hydraulic jacking tools allowing for a manual horizontal jacking process by processing calculations for a plurality of measurements received from the digital sensors,
wherein the jacking system includes an automated horizontal jacking assembly comprising at least two electric gear head motors and/or a pair of air gear motor driven screw jacks capable of being operated automatically based on at least one signal from the control and computing interface module.

15. The precision shaft alignment system of claim 11, wherein the floating engagement device provides freedom of movement for at least one jack of the jacking system by allowing a movement of the at least one jack when a second jack is moving,
wherein the floating engagement device provides the ability to compensate for static movement of the at least one jack by making a comparison after force is applied and then released, and
wherein a plurality of information related to the movement of the at least one jack is communicated to the control and computing interface module to determine a dynamic positioning value.

16. The precision shaft alignment system of claim 11, wherein the digital sensors measure misalignment of the first shaft and the second shaft and communicate the measured misalignment to the control and computing interface module to perform dynamic, direct-response calculations to correct the measured misalignment by horizontal movement of at least one jack of the jacking system.

17. The precision shaft alignment system of claim 11, further comprising a program having built-in soft foot detection, wherein the software is capable of determining vertical alignment correction information, wherein the vertical alignment correction information is displayed on a display to allow a user to correct a soft foot, wherein the display displays an amount of front and/or rear shims required to correct a vertical alignment process of the first shaft and the second shaft.

18. The precision shaft alignment system of claim 11, wherein a vertical alignment process includes measuring and inputting a distance between the digital sensors and a distance from the digital sensor mounted to the second shaft to a front motor foot and a rear motor foot,
wherein a vertical alignment of the first shaft and the second shaft is obtained by adding or subtracting the amount of front and/or rear shims required to correct the vertical alignment process, and
wherein the vertical alignment of the first shaft and the second shaft is obtained as indicated by at least one directional flashing light under at least one of a front mounting and a rear mounting of the system.

19. The precision shaft alignment system of claim 11, wherein vertical positioning of the first shaft and the second shaft is automated, wherein the system further comprises:
 a. a coil-energized valve;
 b. a pump that powers the valve and is responsive to the control and computing interface module; and
 c. one or more support means activated by the pump, wherein the one or more support means lift, hold and/or lower a front and/or a rear of the variable-position unit,
wherein a displayed number of front shims and rear shims are added or removed, as calculated by the control and computing interface module.

20. The precision shaft alignment system of claim 19, wherein the one or more support means is selected from the group consisting of cylinders and air bags.

* * * * *